United States Patent
Hosoi et al.

(10) Patent No.: US 11,141,721 B2
(45) Date of Patent: Oct. 12, 2021

(54) POROUS STRUCTURE FOR EXHAUST GAS PURIFICATION CATALYST, EXHAUST GAS PURIFICATION CATALYST USING POROUS STRUCTURE, AND EXHAUST GAS PURIFICATION METHOD

(71) Applicant: Mitsui Mining & Smelting Co., Ltd., Tokyo (JP)

(72) Inventors: Yusuke Hosoi, Saitama (JP); Hironori Iwakura, Saitama (JP); Takashi Wakabayashi, Saitama (JP); Yunosuke Nakahara, Saitama (JP)

(73) Assignee: Mitsui Mining & Smelting Co., Ltd., Tokyo (JP)

( * ) Notice: Subject to any disclaimer, the term of this patent is extended or adjusted under 35 U.S.C. 154(b) by 0 days.

(21) Appl. No.: 17/268,123

(22) PCT Filed: Aug. 5, 2019

(86) PCT No.: PCT/JP2019/030646
§ 371 (c)(1),
(2) Date: Feb. 12, 2021

(87) PCT Pub. No.: WO2020/039903
PCT Pub. Date: Feb. 27, 2020

(65) Prior Publication Data
US 2021/0245147 A1 Aug. 12, 2021

(30) Foreign Application Priority Data

Aug. 22, 2018 (JP) .............................. JP2018-155789

(51) Int. Cl.
| | |
|---|---|
| *B01J 35/00* | (2006.01) |
| *B01J 35/04* | (2006.01) |
| *B01J 35/10* | (2006.01) |
| *B01J 23/00* | (2006.01) |
| *B01J 23/10* | (2006.01) |
| *B01J 23/63* | (2006.01) |
| *B01J 21/04* | (2006.01) |
| *B01D 53/94* | (2006.01) |
| *F01N 3/28* | (2006.01) |

(52) U.S. Cl.
CPC ........ *B01J 35/108* (2013.01); *B01D 53/9459* (2013.01); *B01J 21/04* (2013.01); *B01J 23/002* (2013.01); *B01J 23/10* (2013.01); *B01J 23/63* (2013.01); *B01J 35/0006* (2013.01); *B01J 35/04* (2013.01); *B01J 35/1019* (2013.01); *B01J 35/1061* (2013.01); *F01N 3/2825* (2013.01); *B01D 2255/1023* (2013.01); *B01D 2255/1025* (2013.01); *B01D 2255/407* (2013.01); *B01D 2255/908* (2013.01); *B01D 2255/9155* (2013.01); *B01D 2255/9202* (2013.01); *B01D 2255/9205* (2013.01); *B01D 2255/9207* (2013.01); *F01N 2330/06* (2013.01); *F01N 2370/02* (2013.01)

(58) Field of Classification Search
CPC ................ B01D 53/94; B01D 53/9481; B01D 2255/00; B01D 2255/908; B01D 2255/9205; B01D 2258/012; B01J 35/1033; B01J 35/1052; B01J 35/1066; B01J 35/108; F01N 3/0864; F01N 2250/12
See application file for complete search history.

(56) References Cited

U.S. PATENT DOCUMENTS

| | | | |
|---|---|---|---|
| 5,397,758 A * | 3/1995 | Bouruetaubertot | ...... B01J 23/10 502/303 |
| 2006/0292393 A1 | 12/2006 | Kunieda | |
| 2008/0167181 A1 | 7/2008 | Nakamura et al. | |
| 2014/0371058 A1 | 12/2014 | Nagao et al. | |
| 2016/0045896 A1 | 2/2016 | Imada et al. | |
| 2016/0271590 A1 | 9/2016 | Suzuki et al. | |
| 2016/0279606 A1 * | 9/2016 | Abe | .......................... B01J 21/04 |
| 2017/0182481 A1 * | 6/2017 | Fujimoto | ............. B01J 35/1047 |
| 2018/0252139 A1 * | 9/2018 | Hatanaka | ................. B01J 37/04 |
| 2019/0144342 A1 | 5/2019 | Goto et al. | |

FOREIGN PATENT DOCUMENTS

| | | |
|---|---|---|
| CN | 105983339 A | 10/2016 |
| JP | 11-104493 A | 4/1999 |
| JP | 2017-64627 A | 4/2017 |
| WO | 2006/070540 A1 | 7/2006 |
| WO | 2014/156676 A1 | 10/2014 |
| WO | 2015/037536 A1 | 3/2015 |
| WO | 2018/012565 A1 | 1/2018 |

OTHER PUBLICATIONS

International Search Report (ISR) dated Oct. 8, 2019 filed in PCT/JP2019/030646.

* cited by examiner

*Primary Examiner* — Timothy C Vanoy
(74) *Attorney, Agent, or Firm* — Rankin, Hill & Clark LLP

(57) ABSTRACT

Provided is a porous structure for exhaust purification catalysts having excellent light-off temperature characteristics. The porous structure for exhaust purification catalysts includes an oxygen storage component and an inorganic porous solid. The porous structure has a pore volume distribution such that the ratio of the pore volume of pores with a diameter of from 15 nm to less than 25 nm to the pore volume of pores with a diameter of from 5 nm to less than 15 nm is 1.3 to 2.5 as measured with a mercury porosimeter. The pore volume distribution preferably has at least one peak top in a pore diameter range of from 15 nm to less than 25 nm.

5 Claims, No Drawings

POROUS STRUCTURE FOR EXHAUST GAS PURIFICATION CATALYST, EXHAUST GAS PURIFICATION CATALYST USING POROUS STRUCTURE, AND EXHAUST GAS PURIFICATION METHOD

TECHNICAL FIELD

This invention relates to a porous structure for exhaust gas purification catalysts and a catalyst and a method for purifying exhaust gas.

BACKGROUND ART

Conventionally proposed catalysts for purifying exhaust gas emitted from internal combustion engines include three-way catalysts (TWCs) for converting three components, i.e., CO, HC, and $NO_x$, in exhaust gas emitted from gasoline engines, diesel oxidation catalysts (DOCs) for converting CO and HC in exhaust gas emitted from diesel engines, or lean $No_x$ trap catalysts (LNTs).

An exhaust gas purification catalyst generally includes a porous substrate, such as a honeycomb substrate, and a catalyst layer formed thereon, the catalyst layer being formed of an inorganic material carrier having a noble metal supported thereon. The inorganic material to be used is usually porous and thus has a large specific surface area, for the purpose of increasing probability of contact of the noble metal with an exhaust gas component thereby to improve exhaust gas conversion efficiency.

Techniques for increasing the probability of contact of a noble metal with an exhaust gas component thereby improving conversion efficiency are known in which the catalyst layer is designed to have a pore volume in a specific range (Patent Literatures 1 to 3).

CITATION LIST

Patent Literature

Patent literature 1: US 2008/0167181A1
Patent literature 2: US 2014/0371058A1
Patent literature 3: US 2016/0045896A1

SUMMARY OF INVENTION

It is known that the performance of a catalyst for exhaust gas purification is low at a start-up of an internal combustion engine because the environmental temperature is too low for the catalyst to perform sufficiently. Improvement on purification performance at engine start-up (i.e., light-off temperature characteristics) has been demanded.

To address this issue, the conventional exhaust gas purification catalysts of patent literatures 1 to 3 cannot be said to achieve sufficient light-off temperature characteristics, though they are with the focus on the pore volume of the catalyst layer.

An object of the invention is to provide a porous structure capable of making an exhaust gas purification catalyst having excellent light-off temperature characteristics and a catalyst and a method for exhaust gas purification using the porous structure.

The inventors have extensively studied the relation between the pore volume distribution in a porous structure for an exhaust purification catalyst and the light-off temperature characteristics of the catalyst. As a result, they have found that the light-off temperature characteristics is effectively improved by controlling the pore volume distribution of relatively fine pores with a pore diameter between 5 and 25 nm, which has not hitherto been considered.

On the basis of the above findings, the invention provides in the first aspect a porous structure for exhaust purification catalysts including an oxygen storage component and an inorganic porous solid and having a pore volume distribution such that the ratio of the pore volume of pores with a diameter of from 15 nm to less than 25 nm to the pore volume of pores with a diameter of from 5 nm to less than 15 nm is 1.3 to 2.5 as measured with a mercury porosimeter.

The invention provides in the second aspect an exhaust gas purification catalyst including a substrate and a catalyst layer formed on the substrate, the catalyst layer containing an oxygen storage component and an inorganic porous solid. The exhaust gas purification catalyst has a pore volume distribution such that the ratio of the pore volume of pores with a diameter of from 15 nm to less than 25 nm to the pore volume of pores with a diameter of from 5 nm to less than 15 nm is 1.3 to 2.5 as measured with a mercury porosimeter.

The invention provides in the third aspect a method for purifying exhaust gas, the method including contacting exhaust gas from an internal combustion engine with the exhaust gas purification catalyst.

DESCRIPTION OF EMBODIMENTS

The invention will be described on the basis of a preferred embodiment thereof. In an exhaust gas purification catalyst including a substrate and a catalyst layer formed thereon, the porous structure for exhaust gas purification catalysts (hereinafter also simply referred to as the "porous structure") of the present embodiment may be used as the catalyst layer, for example. The porous structure may be of a single catalyst layer or composed of a plurality of catalyst layers.

The porous structure of the embodiment preferably contains an oxygen storage component (also called oxygen storage capacity (OSC) material) and an inorganic porous solid. The porous structure of the embodiment owes its porosity primarily to the inorganic porous solid. When the oxygen storage component is porous, the porous structure of the embodiment also owes its porosity to the oxygen storage component.

The degree of porosity of the porous structure is represented in terms of pore volume distribution measured with a mercury porosimeter. The pore volume distribution of the porous structure is preferably such that the ratio of the pore volume of pores with a diameter of from 15 nm to less than 25 nm (pore volume B) to the pore volume of pores with a diameter of from 5 nm to less than 15 nm (pore volume A), B/A, is 1.3 to 2.5, more preferably 1.4 to 2.3, even more preferably 1.6 to 2.1.

The improvement on light-off temperature characteristics achieved by the use of the porous structure having the ratio B/A in the range of from 1.3 to 2.5 is believed to be accounted for as follows. Because exhaust easily enters relatively large pores with a diameter of 15 nm or greater and smaller than 25 nm, the amount of exhaust entering the pores of the porous structure will be controlled by adjusting the ratio of the pore volume of the relatively large pores, thereby enhancing the contact of the exhaust gas with the catalyst active component present in the pores. On the other hand, the specific surface area increases with an increase of relatively fine pores with a diameter of 5 nm or greater and smaller than 15 nm. An effective surface area for contacting exhaust gas with the catalyst active component will be secured by adjusting the ratio of the pore volumes of the relatively fine pores. Accordingly, when the pore volume A of the pores with a diameter of 5 nm or greater and smaller than 15 nm and the pore volume B of the pores with a diameter of 15 nm or greater and smaller than 25 nm satisfy the above specified relation, efficient contact of exhaust with the catalyst active component present in the porous structure is achieved to improve the light-off temperature characteristics.

As stated, what is of importance in the invention resides in the balance between the pore volume of the pores with a diameter of from 5 nm to less than 15 nm, the pore volume A, and the pore volume of the pores with a diameter of from 15 nm to less than 25 nm, the pore volume B. Therefore, the inventors consider that the improvement on the light-off temperature characteristics would be accomplished only by the ratio B/A falling within the specific range regardless of the pore arrangement in the thickness direction.

With a view to further improving the light-off temperature characteristics, the pore volume distribution is preferably such that the pore volume of pores with a diameter of from 5 nm to less than 25 nm is not more than $600 \times 10^{-3}$ $cm^3/g$, more preferably $10 \times 10^{-3}$ $cm^3/g$ to $350 \times 10^{-3}$ $cm^3/g$.

In the embodiment, the pore volume distribution is measured by mercury porosimetry using a mercury porosimeter. Mercury porosimetry is a method in which the amount of mercury intruded into pores is measured while varying the pressure applied to mercury to determine the pore (void) distribution. The condition allowing mercury to intrude into pores is represented by equation: $PD=-4\sigma \cos \theta$, wherein P is a pressure, D is a pore diameter, $\theta$ is a contact angle of mercury, and $\sigma$ is a surface tension of mercury. The amount V of the liquid intruded is measured at each pressure P while pressure P is varied, and the pressure P is converted to a pore diameter D using the above equation to prepare a DV plot, from which a pore volume distribution is obtained. The pore volume is obtained from the amount of mercury intruded into the pores. In the case where the porous structure is a catalyst layer formed on the substrate of an exhaust gas purification catalyst, the porosity of the substrate, the pore diameters of which are usually greater than 500 nm, does not affect the pore volume distribution of pores with a diameter of 25 nm or smaller. Therefore, the pore volume distribution measured with a mercury porosimeter may be of the porous structure per se or of an exhaust gas purification catalyst having the porous structure and a catalyst substrate. The pore volume distribution can be determined by the method described in Examples given later.

The pore volume distribution of the porous structure of the embodiment as measured by mercury porosimetry preferably has at least one peak top in a pore diameter range of from 15 nm to less than 25 nm with a view to causing exhaust to efficiently penetrate inside the porous structure thereby to enhance the contact of the exhaust with the catalyst active component and further improve the light-off temperature characteristics. It is particularly preferred for the pore volume distribution to have a peak top in a diameter range of 20 nm to less than 25 nm. As long as the pore volume distribution has at least one peak top in the pore diameter range of from 15 nm to less than 25 nm, it may have a peak top in other ranges.

The "peak top" as referred to above can be determined as follows. Pore volume measurement is carried out in a pore diameter range of from 15 nm to less than 25 nm by mercury porosimetry. An increment in pore volume between adjacent measurement points is calculated from the resulting DV plot, and a measurement interval showing the greatest increment is extracted. The pore diameter on the smaller side of that interval is taken as a peak top. The number of measurement points is based on the specifications of the measurement system used in Examples given later.

With a view to further improvement in the light-off temperature characteristics, the porous structure of the embodiment preferably has a pore volume in the diameter range of from 5 nm to less than 15 nm of $250 \times 10^{-3}$ $cm^3/g$ or less, more preferably $5 \times 10^{-3}$ $cm^3/g$ to $150 \times 10^{-3}$ $cm^3/g$. With the same view, the pore volume in the diameter range of from 15 nm to less than 25 nm is preferably $400 \times 10^{-3}$ $cm^3/g$ or less, more preferably $5 \times 10^{-3}$ $cm^3/g$ to $250 \times 10^{-3}$ $cm^3/g$.

The porous structure having the above discussed pore volume distribution can be obtained by tailoring the pore diameters of the inorganic porous solid powder and/or oxygen storage component powder that make up the catalyst layer, the amounts of the inorganic porous solid powder and the oxygen storage component powder, and the firing temperature and time.

As long as the ratio B/A in the diameter range of from 5 nm to less than 25 nm is within the above specified range, the other elements of the pore volume distribution of the porous structure of the embodiment are not limited. Nevertheless, the following pore volume ratios can be mentioned as a preferred pore volume distribution as measured on the porous structure with a substrate.

When the pore volume distribution is measured on a system including the porous structure and a substrate, the ratio of the pore volume of pores with a diameter of from 5 nm to less than 15 nm to the total pore volume is preferably 5% to 35%, more preferably 5% to 20%, with the view to improving exhaust diffusibility while increasing the specific surface area thereby to further improve the light-off temperature characteristics. On the other hand, the ratio of the pore volume of pores with a diameter of 15 nm to less than 25 nm to the total pore volume is preferably 10% to 50%, more preferably 13% to 30%. As used therein, the term "total pore volume" refers to the pore volume in a diameter range of from 3 to 350,000 nm measured with a mercury porosimeter and including the volume of pores of the substrate as well as the volume of pores of the porous structure.

Even when the pore volume distribution is measured on a system including the porous structure and the substrate, the pore volume distribution in a pore diameter region smaller than 500 nm can be determined regardless of the presence of a substrate, because the pore diameters of a substrate are generally 500 nm or greater.

As previously described, the exhaust gas purification catalyst of the invention includes a substrate and the porous structure of the invention formed thereon, and accordingly, the above discussed pore volume distribution of the porous structure of the invention as measured with the substrate corresponds to the pore volume distribution of the exhaust gas purification catalyst of the invention. Examples of the substrate will be described later.

In order to further improve the light-off temperature characteristics, the ratio of the pore volume of pores with a diameter of from 5 nm to less than 15 nm to the pore volume of pores with a diameter of 5 to 200 nm in the pore volume distribution is preferably 15% to 40%, more preferably 15% to 35%, even more preferably 15% to 30% in the present invention. The pores with a diameter of 5 to 200 nm mostly belong to the porous structure. Therefore, there is no substantial difference in the pore volume distribution in that diameter range between measurement on the porous structure per se and measurement on the substrate with the porous structure.

For the same purpose as above, the ratio of the pore volume of pores with a diameter of 15 nm to less than 25 nm to the pore volume of pores with a diameter of 5 to 200 nm is preferably 20% to 60%, more preferably 25% to 55%, even more preferably 30% to 50%.

The porous structure preferably contains a catalyst active component. The catalyst active component may be one or more selected from the group consisting of platinum (Pt), palladium (Pd), rhodium (Rh), ruthenium (Ru), iridium (Ir), osmium (Os), silver (Ag), copper (Cu), iron (Fe), manganese (Mn), and cobalt (Co). Inter alia, at least one of Pt, Pd, and Rh is preferably used to enhance the exhaust purification performance. For instance, when the porous structure has a multi-layer structure including a lower catalyst layer and an upper catalyst layer, it is preferred for enhancing the exhaust purification performance that the lower and upper catalyst layers contain different catalyst active components. It is more preferred for further enhancing the exhaust purification performance that the lower catalyst layer and the upper catalyst layer contain Pd, and Pt or Rh, respectively.

As used herein, the term "lower catalyst layer" refers to a layer closer to a substrate on which the multi-layered catalyst layer is formed, and the term "upper catalyst layer" refers to a layer on the other side of the lower catalyst layer than the substrate side thereof. The porous structure may have one or more other layers in addition to the lower and upper catalyst layers. For instance, the porous structure may have an additional layer between the substrate and the lower catalyst layer, or an additional layer between the lower and upper catalyst layers.

The catalyst active component is preferably supported in the porous structure, specifically supported on the oxygen storage component and inorganic porous solid making up the porous structure. As used herein, the expression "supported on" means being physically or chemically adsorbed to or held on the outer surfaces or inner walls of pores. Specifically, the state of one particle supporting another particle can be confirmed by, for example, measuring the particle sizes in scanning electron microscope (SEM) microscopy. The average particle size of "particles that are present on the surface of 'individual particles'" is preferably 10% or less, more preferably 3% or less, even more preferably 1% or less, based on the average particle size of the "individual particles". The term "average particle size" as used herein refers to an average of the maximum Feret diameters of at least 30 particles in SEM microscopy. The "maximum Feret diameter" is defined as the largest distance between two parallel lines in contact with a particle figure.

The amount of the catalyst active component contained in the porous structure is preferably 0.1 to 10 mass %, more preferably 0.15 to 7 mass %, based on the porous structure in terms of cost reduction and enhanced light-off temperature characteristics. The amount of the catalyst active component in the porous structure can be determined by, for example, the following method. First, a solution is prepared by dissolving the porous structure, and the amounts of the elements in the solution are determined by ICP-AES. Out of the found amounts of the various elements, the amount of the catalyst active element(s) is obtained, and the amounts of the other elements are converted into amounts of their respective oxides to make a total of 100. The ratio of the elemental catalyst active component to the total of 100 is calculated. In the case where the porous structure is formed on a substrate, the porous structure is separated from the substrate, and the measurement as described above is made on the separated porous structure.

The porous structure contains an oxygen storage component and an inorganic porous solid as stared earlier. Examples of the OSC material include ceria ($CeO_2$) and cerium-zirconium complex oxide (hereinafter also referred to as $Ce_2$—$ZrO_2$), and $CeO_2$—$ZrO_2$ is preferred for its high OSC. $CeO_2$—$ZrO_2$ is a solid solution of $CeO_2$ and $ZrO_2$. The formation of a solid-solution of $CeO_2$—$ZrO_2$ can be confirmed by checking whether a diffraction pattern assigned to $CeO_2$—$ZrO_2$ is obtained in X-ray diffractometry (XRD).

While the porous structure of the embodiment contains an inorganic porous solid in addition to the oxygen storage component (OSC material), it is preferable that the OSC material per se be also porous, in view of facilitating supporting of the catalyst active component. Whether the OSC material in the porous structure is porous can be confirmed by observation using an SEM and also analyzing the composition of the porous structure by energy dispersive X-ray spectroscopy (EDX) or electron probe microanalysis (EPMA).

The oxygen storage component, such as $CeO_2$ or $CeO_2$—$ZrO_2$, may contain a rare earth element other than cerium, an alkaline earth metal element, e.g., Ba, Sr, or Ca, magnesium (Mg), aluminum (Al), and the like. As used herein, the term "contain" is intended to encompass the form of "solid solution" and the form of "modification". The term "modification" means that a modifying element is present on the surface of an oxygen storage component, encompassing the concept of "supporting". As used herein, the term "surface" refers to the inner walls of the pores of the oxygen storage component and the outer surface of the oxygen storage component. Examples of the rare earth element other than cerium include scandium (Sc), yttrium (Y), lanthanum (La), praseodymium (Pr), neodymium (Nd), samarium (Sm), europium (Eu), gadolinium (Gd), terbium (Tb), dysprosium (Dy), holmium (Ho), erbium (Er), thulium (Tm), ytterbium (Yb), and lutetium (Lu). The rare earth element contained in the oxygen storage component may be in the form of an oxide. Two or more of these rare earth elements may be present in the form of their complex oxide. An oxide of a rare earth element other than cerium may or may not form a solid solution with $CeO_2$ or $Ce_2$—$ZrO_2$. Whether an oxide of a rare earth element other than cerium is in the form of a solid solution with $CeO_2$ or $CeO_2$—$ZrO_2$ can be confirmed by XRD in the same manner as described above.

The inorganic porous solid used together with the oxygen storage component is exemplified by a porous solid of an inorganic compound other than the oxygen storage component. Examples of the inorganic porous solid include oxide materials based on alumina ($Al_2O_3$), $Zr_2$, $SiO_2$, $TiO_2$, a rare earth oxide ($Re_2O_3$, e.g., $La_2O_3$), zeolite (aluminosilicate), apatite-type lanthanum silicate, MgO, ZnO, $SnO_2$, and the like; and composites of these oxide materials. The alumina may be of $\gamma$, $\delta$, $\theta$, or a crystal form. Examples of the inorganic porous solid also include phosphates, silicates, and borates of Al, Zr, Si, Ti, a rare earth element, Mg, and Zn; and sparingly soluble sulfates of alkaline earth metals, e.g., Ba and Sr.

In the case of using apatite-type lanthanum silicate, the presence of this inorganic porous solid can be confirmed by composition analysis through XRD or ICP-AES. The presence of the inorganic porous solid other than the OSC material in the porous structure can be confirmed by observing the porous structure using an SEM and also analyzing the composition of the porous structure by energy dispersive X-ray spectroscopy (EDX) or electron probe microanalysis (EPMA).

When the porous structure contains a binder as will be described hereafter, the inorganic porous solid or OSC material may be of the same material as the binder. Even in such a case, the inorganic porous solid and the OSC material can be distinguished from the binder component by the measurement of particle sizes or analyzing the components contained in each material by EDX or EMPA as described above.

The inorganic porous solid, such as alumina, may contain other substances, such as lanthanum oxide, $ZrO_2$, and $CeO_2$. As used herein, the term "contain" is intended to encompass the form of "solid solution" and the form of "modification" as discussed with respect to the oxygen storage component. While $CeO_2$ is an oxygen storage component as described above, the inorganic porous solid other than the oxygen storage component may be the one modified with or support an oxygen storage component, such as $Ce_2$. Therefore, the inorganic porous solid other than the oxygen storage component may be, for example, alumina or a like substance having $CeO_2$ supported on its outer surface or the inner walls of its pores.

As described, the porous structure may have a singlelayer or multilayer structure. In the latter case, every layer may have both the OSC material and the inorganic porous solid, or alternatively, one layer may have one of the OSC material and the inorganic porous solid while another layer may have the other. It is particularly preferred for obtaining further enhanced exhaust gas purification performance that the porous structure of the embodiment have a dual layer structure composed of an upper catalyst layer and a lower catalyst layer and that each catalyst layer have the OSC material and the inorganic porous solid. When the porous structure has two or more catalyst layers each containing the OSC material and inorganic porous solid, the individual layers may be distinguished by detecting the difference in, for example, kind or amount of the catalyst active component present in the individual layers. For instance, a catalyst is cut perpendicular to the longitudinal direction thereof and the resultant is embedded with a resin to obtain a sample. The sample is analyzed by EDX line analysis, and the catalyst active component distribution is digitalized to prepare a fluctuation curve. A distinction of the catalyst layers can be made based on the fluctuation curve.

In order for the OSC material to deliver its performance to enhance exhaust gas purification at low temperatures in balance with heat resistance, the content of the OSC material in the porous structure is preferably 5 to 80 mass %, more preferably 10 to 60 mass %. For the same purpose, the content of the inorganic porous solid in the porous structure is preferably 5 to 80 mass %, more preferably 10 to 60 mass %.

It is preferred that the OSC material be present at a higher content than the inorganic porous solid content in the porous structure so that the fluctuations in air-fuel ratio (A/F) of the exhaust gas flowing to the exhaust purification catalyst may sufficiently be negated even in low temperatures thereby to improve the exhaust purification performance. To further enhance this effect, the ratio of the inorganic porous solid content to the OSC material content is preferably 0.2 to 0.8, more preferably 0.3 to 0.7, even more preferably 0.4 to 0.6. When the porous structure has a multilayer structure, the overall OSC material content may be higher than the overall inorganic porous solid content of the porous structure. It is preferred for the porous structure as a whole to have the above content ratio. It is more preferred that the OSC material content be higher than the inorganic porous solid content in each layer. It is even more preferred that each layer satisfy the above content ratio.

The OSC material and inorganic porous solid contents in the porous structure can be determined as follows. Taking, for instance, the case where the OSC material and the inorganic porous solid are $CeO_2$—$ZrO_2$ and $Al_2O_3$, respectively, the porous structure is dissolved to prepare a solution, which is analyzed for elemental composition by ICP-AES. Out of the found amounts of the various elements, the amounts of $CeO_2$, $ZrO_2$, and $Al_2O_3$ are obtained, and the amounts of the other elements are converted into amounts of their respective oxides to make a total of 100. The ratios of $CeO_2$, $ZrO_2$, and $Al_2O_3$ to the total of 100 are calculated. The amounts of the OSC material other than $Ce_2$—$ZrO_2$ and the inorganic porous solid other than $Al_2O_3$ are calculated in the same manner. In the case where the porous structure is formed on a substrate, the porous structure is separated from the substrate, and the measurement as described above is made on the separated porous structure.

The porous structure of the embodiment can be formed as a catalyst layer on the surface of a catalyst substrate to provide an exhaust gas purification catalyst which is capable of efficiently bringing exhaust gas into contact with the catalyst active component even at an engine start-up thereby improving light-off temperature characteristics. The catalyst substrate is preferably porous and may have a honeycomb shape. Examples of a material for the substrate include ceramics, such as alumina ($Al_2O_3$), mullite ($3Al_2O_3 \cdot 2SiO_2$), cordierite ($2MgO \cdot 2Al_2O_3 \cdot 5SiO_2$), aluminum titanate ($Al_2TiO_5$), and silicon carbide (SiC).

The porous structure of the embodiment and the exhaust gas purification catalyst using the same can advantageously be prepared by mixing the OSC material powder, the inorganic porous solid powder, and, if desired, a salt of a catalyst active component, and a binder to make a slurry, applying the slurry to a substrate (e.g., washcoating), drying, and firing the coating layer to form a porous structure as a catalyst layer on the substrate.

The porous structure and exhaust gas purification catalyst of the invention having a desired ratio B/A can be obtained easily by tailoring the pore distribution, pore diameter, and content of the inorganic porous solid and, if needed, the pore distribution, pore diameter, and content of the OSC material. As used herein, the term "pore diameter" refers to the pore diameter of the peak showing the largest differential pore volume in the pore volume measurement over a broadened range of from 3 to 500 nm so as to determine the pore volume fractions of the primary and secondary particles of the inorganic porous solid and OSC material.

From the standpoint of ease of obtaining the porous structure and exhaust gas purification catalyst having a desired ratio B/A, the pore diameter of the inorganic porous solid is preferably 3 to 50 nm, more preferably 3 to 35 nm, even more preferably 5 to 25 nm, regardless of whether the porous structure is single-layered or multi-layered. When the pore diameter of the OSC material is tailored instead of, or in addition to, the pore diameter of the inorganic porous solid so as to obtain the porous structure and the exhaust gas purification catalyst having a desired ratio B/A, the pore diameter of the OSC material is preferably 3 to 50 nm, more preferably 5 to 50 nm, even more preferably 10 to 50 nm, yet more preferably 15 to 45 nm, irrespective of whether the porous structure is single-layered or multi-layered.

Regardless of whether the porous structure is single-layered or multi-layered, the inorganic porous solid preferably has a BET specific surface area of 30 to 300 m²/g, more preferably 50 to 200 m²/g, in terms of capacity of supporting the catalyst active component and exhaust gas purification performance. The OSC material, when it is porous, preferably has a BET specific surface area of 10 to 200 m²/g, more preferably 30 to 150 m²/g, in terms of capacity of supporting the catalyst active component and exhaust gas purification performance irrespective of whether the porous structure is single-layered or multi-layered.

From the standpoint of ease of obtaining the porous structure and exhaust gas purification catalyst having a desired ratio B/A, the inorganic porous solid preferably has a particle size Do (the particle diameter at 50 vol % in the volume-based cumulative particle size distribution) of 3 to 50 µm, more preferably 5 to 45 µm, even more preferably 5 to 40 µm, as measured by the laser diffraction method irrespective of whether the porous structure is single-layered or multi-layered. The Do of the OSC material, when it is porous, is preferably 3 to 30 µm, more preferably 5 to 20 µm, even more preferably 5 to 10 µm, in terms of capacity of supporting the catalyst active component and exhaust gas purification performance irrespective of whether the porous structure is single-layered or multi-layered.

The solvent used in the slurry is exemplified by water. Examples of the salt of a catalyst active component include palladium nitrate, rhodium nitrate, and platinum nitrate.

The firing of the slurry-coated substrate is preferably carried out in the atmosphere at a temperature of 400° to 800° C., more preferably 450 to 600° C., in terms of the catalytic activity of the resulting exhaust gas purification catalyst. The firing time is preferably 30 minutes to 6 hours, more preferably 1 to 4 hours. Prior to the firing, the slurry applied to the substrate is preferably dried in the atmosphere. The drying temperature is preferably 40° to 200° C., more preferably 700 to 150° C., and the drying time is preferably 5 minutes to 6 hours, more preferably 10 minutes to 2 hours.

The thus produced porous structure and exhaust gas purification catalyst of the invention exhibit excellent light-off temperature characteristics. Contacting of exhaust gas from an internal combustion engine with the porous structure or the catalyst of the invention enables efficient conversion of $NO_x$, HC, and CO. Similarly, $NO_x$, HC, and CO in the exhaust at an engine start-up can be converted efficiently by the use of the exhaust gas purification catalyst of the invention in an internal combustion engine.

EXAMPLES

The invention will now be illustrated in more detail with reference to Examples, but it should be understood that the invention is not limited thereto. In Examples and Comparative Example, drying and firing were performed in the atmosphere. The specific surface area of the materials used in Examples and Comparative Example was measured by the BET three-point method using a surface area and pore size analyzer (model number: QUADRASORB SI) from Quantachrome. As an adsorbate for measurement, nitrogen gas was used. All the alumina powders used in Examples and Comparative Example were $\gamma$-$Al_2O_3$.

Example 1

(1) Preparation of Slurry for Lower Catalyst Layer

A palladium nitrate aqueous solution was put in a container. An OSC material powder ($CeO_2$—$ZrO_2$ complex oxide; 40 mass % $CeO_2$, 50 mass % $ZrO_2$, and 10 mass % others; BET specific surface area: 85 m²/g; pore diameter: 20 nm; Ds: 6 µm), a first inorganic porous solid powder ($Al_2O_3$ modified with 4 mass % of $La_2O_3$; BET specific surface area: 150 m²/g; pore diameter: 17.6 nm; $D_{50}$: 35 µm), and a second porous solid powder ($Al_2O_3$ modified with 4 mass % of $La_2O_3$; BET specific surface area: 170 m²/g; pore diameter: 9.8 nm; $D_{50}$: 30 m) were added thereto, followed by stirring. The mass ratio of the first inorganic porous solid powder to the second porous solid powder was 91:9. After the powders were sufficiently dispersed, alumina sol ($D_{50}$: <0.2 µm) was added as a binder, and the system was further stirred to prepare a slurry for a lower catalyst layer. The composition of this slurry was designed to form a catalyst layer composed of 60 mass % of the OSC material, 29 mass % of the inorganic porous solids (the first inorganic porous solid+the second inorganic porous solid), 8 mass % of alumina derived from the alumina sol, and 3 mass % of palladium.

(2) Preparation of Slurry for Upper Catalyst Layer

A rhodium nitrate aqueous solution was put in a container. An OSC material powder ($CeO_2$—$ZrO_2$ complex oxide; 15 mass % $CeO_2$, 70 mass % $ZrO_2$, and 15 mass % others; BET specific surface area: 55 m²/g; pore diameter: 40 nm; $D_{50}$: 6 µm) and an inorganic porous solid powder ($Al_2O_3$ modified with 4 mass % of $La_2O_3$; BET specific surface area: 150 m²/g; pore diameter: 14.0 nm; $D_{50}$: 7 µm) were added thereto, followed by stirring. After the powders were sufficiently dispersed, alumina sol ($D_{50}$: <0.2 µm) was added as a binder, and the system was further stirred to prepare a slurry for an upper catalyst layer. The composition of this slurry was designed to form a catalyst layer composed of 60 mass % of the OSC material, 31 mass % of the inorganic porous solid, 8 mass % alumina derived from the alumina sol, and 1 mass % of rhodium.

(3) Making of Exhaust Gas Purification Catalyst

The slurry for lower catalyst layer prepared in (1) above was applied to a ceramic honeycomb substrate (600 cells per inch, 3.5 mil wall thickness), dried at 150° C. for 1 hour, and calcinated at 450° C. for 3 hours to form a lower catalyst layer in an amount of coating of 95 g/L. The slurry for upper catalyst layer prepared in (2) above was then applied on the lower catalyst layer, dried at 150° C. for 1 hour, and calcinated at 450° C. for 3 hours to form an upper catalyst layer in an amount of coating of 50 g/L. An exhaust gas purification catalyst composed of a substrate and two catalyst layers (porous structure) was thus obtained.

Example 2

An exhaust gas purification catalyst was made in the same manner as in Example 1, except for changing the mass ratio of the first inorganic porous solid powder to the second inorganic porous solid powder to 50:50 in the preparation of the slurry for lower catalyst layer in step (1).

Example 3

An exhaust gas purification catalyst was made in the same manner as in Example 1, except for replacing the first and second inorganic porous solid powders with an inorganic porous solid powder ($Al_2O_3$ modified with 1 mass % $La_2O_3$; BET specific surface area: 150 m²/g; pore diameter: 16.0 nm; $D_{50}$: 35 µm) in the preparation of the slurry for lower catalyst layer in step (1).

Example 4

An exhaust gas purification catalyst was made in the same manner as in Example 1, except for changing the mass ratio of the first inorganic porous solid powder to the second inorganic porous solid powder to 30:70 in the preparation of the slurry for lower catalyst layer in step (1).

Example 5

An exhaust gas purification catalyst was made in the same manner as in Example 1, except for changing the mass ratio of the first inorganic porous solid powder to the second inorganic porous solid powder to 9:91 in the preparation of the slurry for lower catalyst layer in step (1).

Comparative Example 1

An exhaust gas purification catalyst was made in the same manner as in Example 1, except for changing the mass ratio of the first inorganic porous solid powder to the second inorganic porous solid powder to 0:100 in the preparation of the slurry for lower catalyst layer in step (1).

Example 6

(1) Preparation of Slurry for Lower Catalyst Layer

A slurry for lower catalyst layer was prepared in the same manner as in Example 1-(1), except for changing the mass ratio of the first inorganic porous solid powder to the second inorganic porous solid powder to 100:0 in the preparation of the slurry for lower catalyst layer in step (1).

(2) Preparation of Slurry for Upper Catalyst Layer

A rhodium nitrate aqueous solution was put in a container. An OSC material powder ($CeO_2$—$ZrO_2$ complex oxide; 15 mass % $CeO_2$, 70 mass % $ZrO_2$, and 15 mass % the others; BET specific surface area: 55 $m^2/g$; pore diameter: 40 nm; $D_{50}$: 6 μm) and a third inorganic porous solid powder ($Al_2O_3$ modified with 4 mass % of $La_2O_3$; BET specific surface area: 150 $m^2/g$; pore diameter: 9.8 nm; $D_{50}$: 7 μm) were added thereto, followed by stirring. After the powders were sufficiently dispersed, alumina sol ($D_{50}$: <0.2 m) was added as a binder, and the system was further stirred to prepare a slurry for an upper catalyst layer. The composition of this slurry was designed to form a catalyst layer composed of 60 mass % of the OSC material, 31 mass % of the third inorganic porous solid, 8 mass % of alumina derived from the alumina sol, and 1 mass % of rhodium.

(3) Making of Exhaust Gas Purification Catalyst

The slurry for lower catalyst layer prepared in (1) above was applied to a ceramic honeycomb substrate (600 cells per inch, 3.5 mil wall thickness), dried at 150° C. for 1 hour, and calcinated at 450° C. for 3 hours to form a lower catalyst layer with an amount of coating of 95 g/L. The slurry for upper catalyst layer prepared in (2) above was then applied on the lower catalyst layer, dried at 150° C. for 1 hour, and calcinated at 450° C. for 3 hours to form an upper catalyst layer having an amount of coating of 50 g/L. An exhaust gas purification catalyst was thus obtained.

The resulting exhaust gas purification catalysts were analyzed for pore volume distribution by the method described below to obtain the following information. The results are shown in Table 1.
(1) Pore volume A ($cm^3/g$) of pores with a diameter of from 5 nm to less than 15 nm.
(2) Ratio (%) of pore volume A to the total pore volume.
(3) Ratio (%) of pore volume A of pores with a diameter of from 5 nm to less than 15 nm to pore volume of pores with a diameter of from 5 to 200 nm.
(4) Pore volume B ($cm^3/g$) of pores with a diameter of from 15 nm to less than 25 nm.
(5) Ratio (%) of pore volume B to the total pore volume.
(6) Ratio (%) of pore volume B of pores with a diameter of from 15 nm to less than 25 nm to pore volume of pores with a diameter of 5 to 200 nm.
(7) Ratio B/A.
(8) Whether there is a peak top in a pore diameter range of from 15 nm to less than 25 nm and, if any, the found value of the peak top (nm).

Measurement of Pore Volume Distribution of Exhaust Gas Purification Catalyst:

A porosimeter "Autopore IV9520" from Shimadzu Corp. was used. The measurement conditions and procedures are as follows.

Measurement Conditions:
  Environment: 25° C.
  Cell: sample cup volume: 3 $cm^3$; stem volume injected: 0.39 $cm^3$
  Measurement range: 0.0035 MPa to 254.925 MPa
  Measuring pressure points: 131 points; Pore diameters of adjacent measurement points being designated D1 and D2 (D1>D2), the measuring pressures were decided so that the difference in the common logarithm between these pore diameters (log D1−log D2) might be 0.037.
  Intrusion volume: controlled between 25% and 80% of the maximum.
  Low-Pressure Parameters:
    Evacuation pressure: 50 μmHg
    Evacuation time: 5.0 min
    Mercury-filling pressure: 0.0034 MPa
    Equilibration time: 10 sec
  High-Pressure Parameters:
    Equilibration time: 10 sec
  Mercury Parameters:
    Advancing contact angle: 130.0°
    Receding contact angle: 130.0°
    Surface tension: 485.0 mN/m (485.0 dyne/cm)
    Density of mercury: 13.5335 g/mL Measuring Procedures:
(1) A test sample having a size of 10 mm 10 mm×10 mm was cut out of a portion, excluding the outer walls of the duel layer-coated substrate, of each of the exhaust gas purification catalysts obtained in Examples and Comparative Example.
(2) Measurement was carried out in the low pressure port at 46 points in a pressure range of from 0.0035 MPa to 0.2058 MPa.
(3) Measurement was carried out in the high pressure port at 85 points in a pressure range of from 0.2241 MPa to 254.9250 MPa.
(4) Pore diameter distribution was calculated from the mercury-filling pressure vs. mercury intrusion data.

The procedures (2) to (4) were carried out automatically by the software installed on the porosimeter. Measurement conditions other than described were in accordance with JIS R1655:2003.

TABLE 1

| | (1) 5-15 nm Pore Volume A ($10^{-3}$ $cm^3/g$) | (2) Ratio of A (%) | (3) Ratio of A to 5-200 nm Pore Volume (%) | (4) 15-25 nm Pore Volume B ($10^{-3}$ $cm^3/g$) | (5) Ratio of B Volume (%) | (6) Ratio of B to 5-200 nm Pore Range 15-25 nm | (7) B/A (%) | (8) Peak Top in Range 15-25 nm |
|---|---|---|---|---|---|---|---|---|
| Example 1 | 27.6 | 7.4 | 16.3 | 68.0 | 18.2 | 40.0 | 2.46 | 21.1 |
| Example 2 | 31.9 | 9.2 | 21.2 | 54.9 | 15.8 | 36.4 | 1.72 | 21.1 |
| Example 3 | 73.9 | 13.4 | 27.9 | 125.2 | 22.8 | 47.3 | 1.69 | 21.1 |
| Example 4 | 32.6 | 9.2 | 20.6 | 54.2 | 15.3 | 34.2 | 1.66 | 21.1 |
| Example 5 | 32.6 | 9.1 | 21.4 | 47.7 | 13.3 | 31.4 | 1.46 | 21.1 |

TABLE 1-continued

|  | (1)<br>5-15 nm<br>Pore Volume A<br>($10^{-3}$ cm³/g) | (2)<br>Ratio of A<br>(%) | (3)<br>Ratio of A to<br>5-200 nm Pore<br>Volume (%) | (4)<br>15-25 nm<br>Pore Volume B<br>($10^{-3}$ cm³/g) | (5)<br>Ratio of B<br>Volume (%) | (6)<br>Ratio of B to<br>5-200 nm Pore<br>Range 15-25 nm | (7)<br>B/A (%) | (8)<br>Peak Top in<br>Range 15-25 nm |
|---|---|---|---|---|---|---|---|---|
| Compara. Example 1 | 37.4 | 10.5 | 24.2 | 48.2 | 13.5 | 31.1 | 1.29 | 21.1 |
| Example 6 | 27.1 | 7.9 | 18.5 | 55.3 | 16.2 | 37.7 | 2.04 | 21.1 |

The exhaust gas purification catalysts of Examples and Comparative Example were evaluated for light-off temperature characteristics by the method below.

Method for T50 Measurement:

A model gas having the composition shown below (A/F=14.6) was allowed to flow through the exhaust gas purification catalyst (catalyst volume: 15 ml) at a rate of 25 L/min while controlling the CO and $O_2$ concentrations of the flowing gas so as to allow the A/F to fluctuate between 14.4 and 14.8. The temperature of the gas flowing through the catalyst was gradually raised from room temperature at a predetermined rate. The concentrations of HC, $NO_x$, and CO in the gas having passed through the catalyst were measured using the analyzer below to calculate conversion rates from expression:

Conversion rate (%)=(X−Y)/X×100 wherein X represents the amount detected before the catalyst was disposed, and Y represents the amount detected after the catalyst was disposed.

The temperature of the model gas at the entrance of the catalyst when the conversion rate reached 50%, namely light-off temperature T50, was obtained. The measurement of T50 was carried out while the gas temperature was being raised.

Composition of model gas (by volume): CO, 0.5%; $C_3H_6$, 1200 ppmC; NO, 500 ppm; $O_2$, 0.50%; $CO_2$, 14%; $H_2O$, 10%; $H_2$, 0.17%; $N_2$, the balance.

Rate of temperature rise: 20° C./min

Measurement of HC, $NO_x$, and CO: Motor Exhaust Gas Analyzer MEXA7100 from Horiba, Ltd. was used.

TABLE 2

|  | T50 (° C.) | | |
|---|---|---|---|
|  | HC | $NO_x$ | CO |
| Example 1 | 166 | 169 | 163 |
| Example 2 | 165 | 168 | 162 |
| Example 3 | 165 | 168 | 162 |
| Example 4 | 166 | 168 | 162 |
| Example 5 | 167 | 169 | 164 |
| Compara. Example 1 | 168 | 171 | 166 |
| Example 6 | 165 | 166 | 162 |

As shown in Table 2, the exhaust gas purification catalyst (porous structure) of each Example, which has a pore volume ratio B/A of from 1.3 to 2.5, has a lower T50 for all of HC, $NO_x$, and CO than that of Comparative Example 1, which has a ratio B/A of 1.29. It has now been clearly demonstrated that use of the porous structure of the invention, which includes an oxygen storage component and an inorganic porous solid and satisfies the pore volume ratio B/A=1.3 to 2.5, provides an exhaust gas purification catalyst having excellent light-off temperature characteristics.

INDUSTRIAL APPLICABILITY

The invention provides a porous structure for exhaust gas purification catalysts having excellent light-off temperature characteristics and an exhaust gas purification catalyst using the porous structure. The exhaust gas purification method of the invention enables efficient conversion of $NO_x$, HC, and CO in exhaust gas emitted from an internal combustion engine at the start-up stage.

The invention claimed is:

1. An exhaust gas purification catalyst comprising a substrate and a catalyst layer on the substrate,
    the catalyst layer comprising an oxygen storage component and an inorganic porous solid,
    the exhaust gas purification catalyst having a pore volume distribution such that a ratio of a pore volume of pores with a diameter of from 15 nm to less than 25 nm to a pore volume of pores with a diameter of from 5 nm to less than 15 nm is 1.4 to 2.5 as measured with a mercury porosimeter,
    the pore volume distribution having at least one peak top in a pore diameter range of from 15 nm to less than 25 nm, and
    the pore volume distribution having a ratio of a pore volume of pores with a diameter of from 5 nm to less than 15 nm to a pore volume of pores with a diameter of 5 to 200 nm is 15% to 35%, and a ratio of a pore volume of pores with a diameter of from 15 nm to less than 25 nm to a pore volume of pores with a diameter of 5 to 200 nm is 25% to 55%.

2. The exhaust gas purification catalyst according to claim 1, wherein the pore volume distribution has a ratio of a pore volume of pores with a diameter of from 5 nm to less than 15 nm to the total pore volume is 5% to 35%, and a ratio of a pore volume of pores with a diameter of 15 nm to less than 25 nm to the total pore volume is 10% to 50%.

3. The exhaust gas purification catalyst according to claim 1, wherein the oxygen storage component is present in a greater amount than the inorganic porous solid.

4. The exhaust gas purification catalyst according to claim 1, wherein the catalyst layer comprises a catalyst active component.

5. A method for purifying exhaust gas, comprising contacting exhaust gas from an internal combustion engine with the exhaust gas purification catalyst according to claim 1.

* * * * *